United States Patent [19]

Laphon

[11] Patent Number: 5,018,908

[45] Date of Patent: May 28, 1991

[54] ANCHOR ASSEMBLY FOR A MINE ROOF BOLT

[75] Inventor: Gary Laphon, Vermillion, Ohio

[73] Assignee: American Mining Supply, Inc., North Ridgeville, Ohio

[21] Appl. No.: 429,472

[22] Filed: Oct. 31, 1989

[51] Int. Cl.$^5$ .............................................. E21D 21/00
[52] U.S. Cl. ...................................... 405/259; 411/52; 411/64
[58] Field of Search ...................... 405/259, 260, 261; 411/44, 45, 47, 52, 57, 64

[56] References Cited

U.S. PATENT DOCUMENTS

| | | |
|---|---|---|
| 2,870,666 | 1/1959 | Dempsey . |
| 2,988,950 | 6/1961 | Dempsey . |
| 3,115,056 | 12/1963 | Teeple . |
| 3,522,755 | 8/1970 | Mitchell . |
| 4,437,795 | 3/1984 | White ................................. 405/259 |
| 4,516,886 | 5/1985 | Wright ................................. 405/261 |
| 4,904,123 | 2/1990 | Calandra et al. ...................... 405/261 |

FOREIGN PATENT DOCUMENTS

| | | |
|---|---|---|
| 515957 | 8/1955 | Canada . |
| 590082 | 1/1960 | Canada . |
| 946190 | 4/1974 | Canada . |
| 2403699 | 1/1974 | Fed. Rep. of Germany ........ 411/64 |
| 1128024 | 1/1957 | France ................................. 411/64 |
| 424187 | 8/1947 | Italy ................................. 411/52 |

*Primary Examiner*—David H. Corbin

[57] ABSTRACT

Anchor assembly for a mine roof bolt or the like in which the bail of an anchor shell having leaves for engaging the side wall of a bore hole has spring fingers for snagging the side wall of a bore hole to prevent downward movement to the anchor shell. The bail has a central opening for the roof bolt to pass through with the central opening having projections that extend inwardly of the opening to form an interference fit with the threads of the bolt as it is rotated through the opening. The leaves of the anchor shell which are clamped against the side wall have surfaces which diverge from tapered surfaces of the plug nut for expanding the anchor shell to prevent plowing between the plug nut and anchor leaves. The surfaces on the leaves extend downwardly from the top to about the bottom of the leaves.

31 Claims, 2 Drawing Sheets

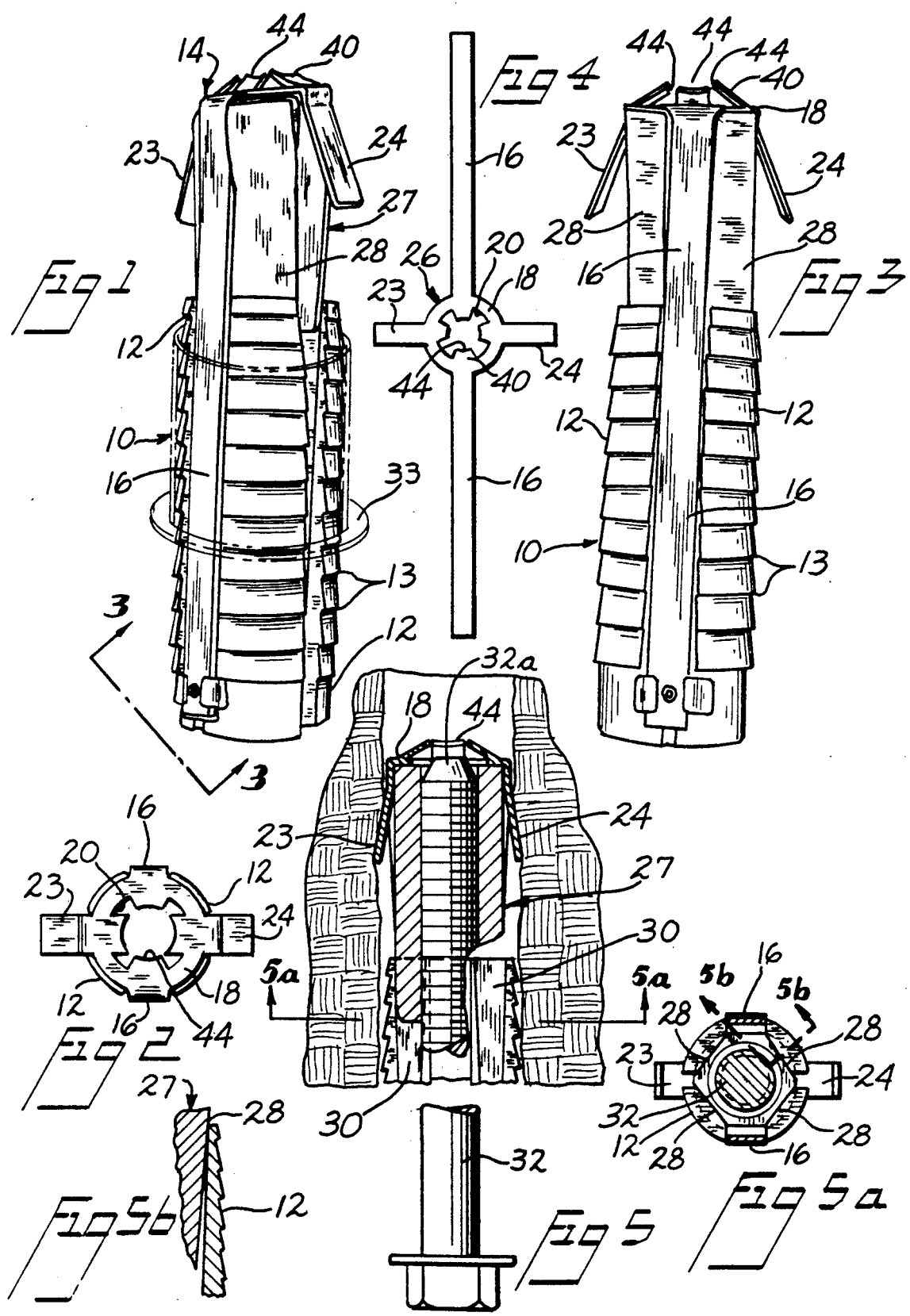

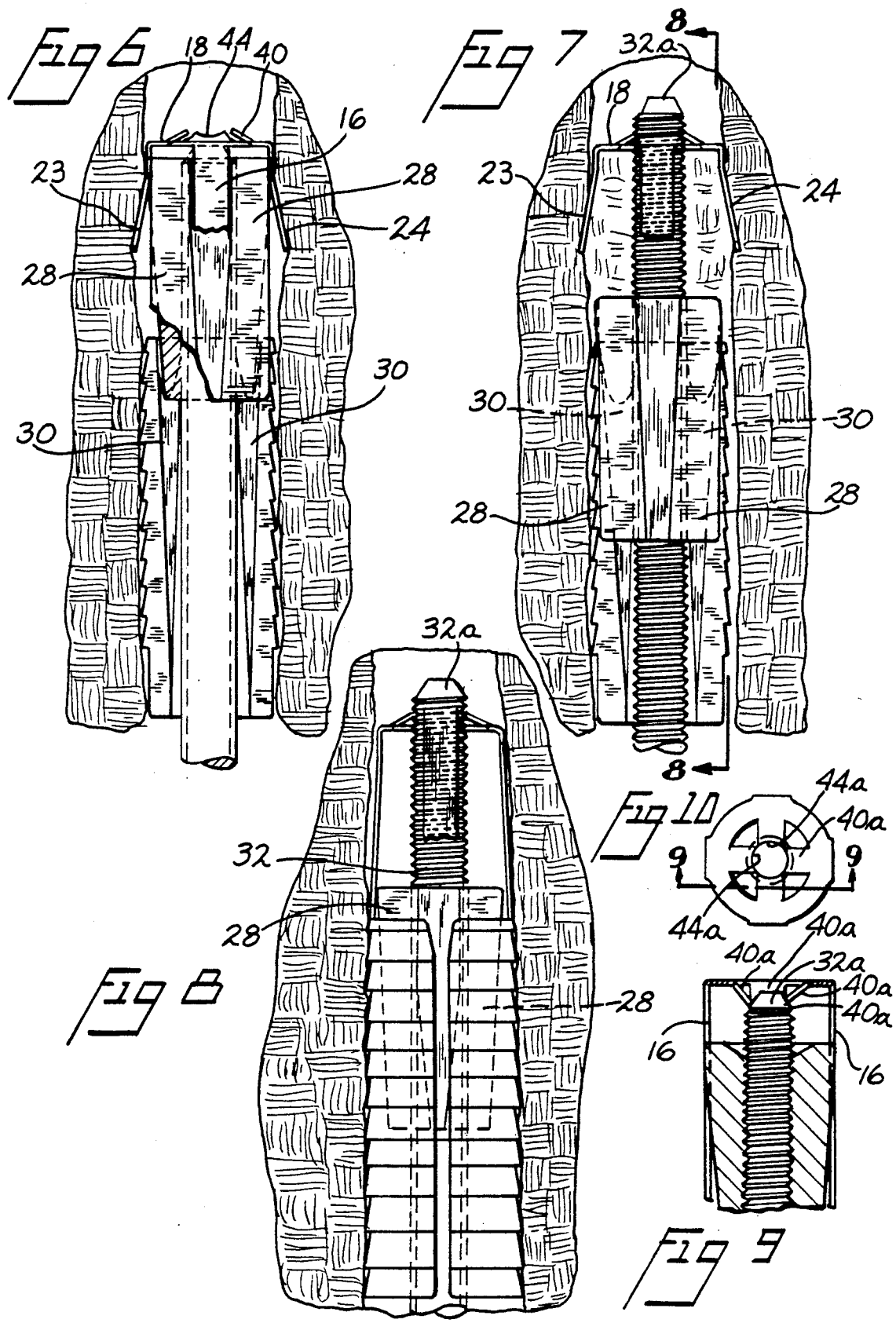

ANCHOR ASSEMBLY FOR A MINE ROOF BOLT

This invention relates to an anchor assembly for bolts used in a blind bore hole, and, more particularly, to a such an assembly for a mine roof bolt.

Mine roof bolts conventionally comprise a long rod headed at one end and threaded at the other. When inserted into a borehole in the mine roof, the leading threaded end has an anchoring assembly associated therewith comprising a tapered wedging plug which is internally threaded to function as a nut and which is threaded on the leading end of the bolt. An anchor shell associated with the plug comprises anchoring leaves which are expanded and clamped against the side wall of the bore hole to anchor the plug and bolt in the bore hole. The bolt is inserted to the depth necessary for the bolt head and a washer plate to engage the mine roof. The bolt is then normally jerked downwardly to initially set the anchor assembly sufficiently to preclude rotation of the anchor assembly with the bolt. Then the bolt head is rotated with a power wrench to load the anchoring assembly to securely clamp the anchor shell in the bore hole and to tension the bolt so as to provide stability in the geological formation in the area of the bolt.

When the anchoring shell is initially set against the bore hole wall by jerking the bolt and wedging plug downwardly, the anchor leaves snag against the sidewall of the bore hole and the anchoring shell holds the plug against rotation with bolt. When the bolt is then rotated it threads through the wedging plug to bring the bolt head and its washer plate back into engagement with the mine roof to hold the bolt against axial movement upwardly, causing the plug to move downwardly relatively to the snagged anchoring shell to wedge the leaves of the shell against the sidewall of the bore hole. As the clamping forces increase with the torquing of the bolt, the tension in the bolt between the nut and the bolt head increases until the bolt is no longer torqued.

In the prior art, the action of the tapered plug (or nut) or the leaves, or both, is relied upon to effect the initial set of the anchor leaves with the bore hole sidewall.

One of the problems with prior art mine roof bolts is assuring that the anchor shell snags quickly when the bolt is jerked to set the anchoring assembly. If it does not snag quickly, then the bolt head may move far enough from the mine roof so that there is insufficient thread length on the bolt for the bolt to thread through the anchored plug to draw the head into engagement with mine roof. This is necessary to properly load the anchor shell and tension the bolt.

In some situations, where the shell does not readily snag, but sufficient resistance can be found in the hole to hold the anchor shell against spinning with the bolt, the installers will try to hold the bolt against axial movement while rotating it to move the plug downwardly to expand the anchor leaves to set the anchor shell against the side wall. This is difficult when working in a mine environment.

In certain prior art anchor assemblies, to set the anchor assembly before loading it, the roof bolts are threaded through the plug into engagement with a bail interconnecting the leaves. This stops the threading of the bolt through the plug and causes the plug to move downwardly to expand the leaves to firmly secure the anchor. When sufficient forces have been established to firmly set the anchor the anchor shell, the bail will breakout to allow the bolt head to engage the roof and establish the proper loading on the anchor assembly and tension in the bolt. Others rely on the bail moving sufficiently without a breakout portion or a destruction of the bail, if necessary, to bring the bolt head into engagement with the mine roof and establish sufficient tension in the bolt.

There is always the problem of providing a construction for anchor assemblies which will preclude the tapered plug from cocking relative to the axis of the bore hole so that as the bolt threads through the plug, it will do so along the axis of the bolt and will not hang up on the sidewall or the bail before engagement of the bolt head with the mine roof. Often this condition happens when the anchor shell assembly is such that it allows a separation of the plug from the leaves when the bolt is jerked downwardly, or considerable plug travel between the leaves is required before the tapered surfaces of the plug engages the leaves to expand them into the sidewall of the hole.

In working toward obtaining a secure anchoring of the assembly and providing a proper tension in the bolt, the prior art has used various types of anchor assemblies.

The prior art includes designs in which the bail of the anchor shell is constructed to constrain the end of the bolt to center on the axis, as well as to preclude axial movement of the bolt with a break away bail after it has threaded outwardly of the plug so as to load the plug and establish clamping forces to firmly set the anchor leaves, with the bail then breaking away to allow the bolt to move axially to engage the bolt head with the mine roof and, on further torquing, to tension the bolt between the plug and the bolt head.

Anchor assemblies typically have a generally cylindrical configuration when inserted into a bore hole and in certain designs the bail has legs connected to the tops of the leaves and the leaves are wedged outwardly by the tapered plug so that the anchoring is done primarily by the lower portion of the leaves. In some of these, an attempt is made to spring bias the bottom of the leafs outwardly of the axis. In another design the legs of the bail are connected to the bottoms of the leaves and the tapered plug is intended to expand the anchor into a generally cylindrical configuration when clamped against the sidewall of the bore hole.

The initial anchoring problems including spinners and the failure to anchor quickly in a bore hole are more difficult to handle in the type of roof bolt in which the legs of the bail interconnecting the leaves are attached to the bottom of the leaves so that the anchor leaves will essentially pivot about the bottom of the leaves the when lower ends of the leaves meet resistance at the side walls as the wedging plug is wedged downwardly between the leaves. This causes the tops to move outwardly so that the leaves will be substantially vertical rather than inclined to the axis and will engage the bore hole for a major portion of their length. While in some such anchor shells, leaves may initially extend angularly to engage the leaf bottoms with the sidewall on insertion, the resistance of the sidewalls will move the leaves toward a vertical position making it more difficult to initially set the anchoring assembly as compared to those which have the bails fixed to the top of the leaves, and, in some cases, provide spring forces urging the legs and leaves outwardly at an angle to the axis of the hole and wedging plug.

SUMMARY OF INVENTION

It is an object of the present invention to provide a simple construction for a roof bolt, or the like, anchor assembly, which has means for holding the assembly against downward movement which does not depend on the wedging action of the tapered plug or on the anchor leaves, and preferably which also acts to minimize the possibility of a spinner in the bore hole.

It is a further object of the present invention to provide and maintain torque resistance to rotation of a roof bolt which is axially moving through the bail of a roof bolt anchor assembly to engage the bolt head with roof of the mine.

It is also an object of the present invention to provide an anchor assembly for a roof bolt or the like which includes an expansion anchor shell and a tapered internally threaded wedging plug for expanding the anchor shell, the shell comprising a bail portion to be disposed across the leading end of a roof bolt having a wedging plug threaded thereon with the construction being such that the torquing of the bolt not only effects a tensioning of the bolt between the wedging plug and the head of the bolt but also creates forces which effect a more secure anchoring of the assembly in the bore hole and a tensioning of the bolt between the bail and the wedging plug.

In accordance with the present invention, an anchoring shell for a mine roof bolt or the like comprises a plurality of expandible anchoring leaves and a bail interconnecting the leaves, the bail having spring fingers or hooks projecting therefrom for snagging or hooking the side wall to hold the anchor assembly against downward movement and provide an initial set for the anchor assembly. The bail has legs extending downwardly from its middle portion for interconnecting the leaves of the bail, preferably two leaves with the legs being connected to the legs at the bottom of the legs. The spring fingers or hooks extend outwardly from the bail to beyond the diameter of the bore hole in which the bolt is to be used and are resiliently deformed when the anchor shell assembly is inserted into a bore hole on the leading end of a bolt. The spring hooks are deformed and biased to hook or snag the sidewall to resist any downward movement of the anchoring assembly in the bore hole independently of any wedging action of a tapered plug or of the leaves of the anchor shell.

A further aspect of the present invention provides a bail for interconnecting the leaves of an anchoring shell assembly for a mine roof bolt, the bail comprising a middle portion which extends across the axis of the anchor shell and the roof bolt used therewith, the middle portion having a central opening which is on the axis of the shell and of a greater diameter than the bolt with which it is used, the central opening having a plurality of projections extending inwardly of the opening and terminating in ends defining a self-threading thread form for engaging a roof bolt being rotated through the tapered plug and said central opening to provide a threaded connection between the bail and the bolt. In the preferred embodiment, the projections are so constructed and arranged that they provide a high torque connection as that term is understood in the art and have an interference fit with threads of the bolt.

A still further aspect of the present invention provides an anchor shell in a roof bolt anchor assembly which has a bail with spring hooks as described and in which a wedging plug which pushes the anchor into the bore hole extends downwardly from the bail to a position in-between the top portions of the leaves to maintain the roof bolt assembly coaxial with the bore hole as it is inserted into a bore hole and as it is set by the bolt and plug being jerked downwardly at the beginning of the operation to anchor the bolt with little downward movement of the wedging plug relative to the anchor shell being needed to effect expanding action by the plug, the wedging plug having wedging surfaces for engaging cooperating surfaces of the leaves of the anchoring shell to expand the shell with the surfaces of the plug and the leaves diverging downwardly and the surfaces of the leaves preferably extending substantially the full length of the leaves from the upper portion thereof. The tapered surfaces of the nut and the surfaces of the leaves are related so that little downward movement of the plug in the normal operation will cause the expansion of the leaves at the upper portion of the leaves, the legs of the bail being connected to the bottoms of the leaves and the leaves preferably being free to move past the legs by reason of slots in the bail.

DESCRIPTION OF THE DRAWINGS

Preferred embodiments of the present invention are illustrated in the accompanying drawings forming a part of the present specification for all subject matter shown therein, and in which:

FIG. 1 is an elevational view of an anchor assembly in accordance with the present invention;

FIG. 2. is a top plan view of the assembly of FIG. 1;

FIG. 3 is an elevational view looking at the assembly of FIG. 1 from the line 3—3 of FIG. 1;

FIG. 4 is a plan view of a stamping to be formed into the bail of the assembly of FIG. 1;

FIG. 5 is a sectional view of a bore hole in the roof of a mine showing a roof bolt having the assembly of FIG. 1 thereon with the bolt being inserted part way into the bore hole, the assembly being shown fragmentarily and partly in section;

FIG. 5a sectional view looking from section line 5a—5a in FIG. 5;

FIG. 5b is a sectional view taken along line 5b—5b of FIG. 5a;

FIG. 6 is a vertical sectional view of a bore hole illustrating the assembly of FIG. 1 in a fully inserted position in the bore hole;

FIG. 7 is a vertical sectional view corresponding to that of FIG. 6, but showing the assembly after the assembly has been set and the bolt therein tensioned;

FIG. 8. is a vertical sectional view of the bore hole of FIG. 7 looking from line 8—8 of FIG. 7 with the anchor assembly and roof bolt shown in elevation;

FIG. 9 is a detached cross-sectional view taken along FIG. 9—9 of FIG. 10 of a roof bolt with a bail and tapered plug of an anchor assembly as described in the embodiment shown in FIGS. 1-8, but with the bail modified to have the thread defining projections extending inwardly and downwardly of the central opening bail and taken along line 9—9 of FIG. 10; and FIG. 10 is a top plan view of the modified bail of FIG. 9.

DESCRIPTION OF PREFERRED EMBODIMENTS

Referring to the drawings, FIG. 1 illustrates a roof bolt anchor assembly 10 embodying the present invention. The anchor assembly comprises two anchoring leaves 12 having essentially a semi-cylindrical configuration and arranged generally cylindrically about an axis to receive a roof bolt therebetween. The outside surfaces of the leaves have a shingled configuration providing horizontal edges 13 for engaging and biting into the side wall of a bore hole. The leaves are interconnected by a bail 14 to provide an anchor shell. The bail has a middle portion 18 extending crosswise of the axis of the shell and opposed legs 16 extending downwardly from the middle portion. The legs 16 are connected to the bottom portion of respective ones of the leaves 12.

The middle portion 18 of the bail is circular and has a central opening 20, see FIGS. 2 & 4, which is of a diameter to freely pass the roof bolt with which the anchor device is used. The opening is centered on the axis of the cylindrically arranged anchor leaves. The anchor assembly also has opposed spring hooks 23, 24, or fingers, extending downwardly and outwardly of the middle portion of the bail in a plane about 90° from the plane containing the opposed legs 12. The bail is preferably formed from a one piece stamping 26 illustrated in FIG. 4 with the stamping being of steel which is formed and tempered to provide the resiliency for the spring hooks.

The anchoring leaves of the anchor shell are expandible by a tapered wedging plug 27 which is positioned in the anchor shell adjacent the underside of the bail central opening 20. The wedging plug extends downwardly to a position below the top portions of the leaves so that there may be some movement of the anchoring leaves downwardly relative to the wedging plug without the lower end of the wedging plug clearing the tops of the leaves. The wedging plug has tapered flats providing surfaces 28 which engage surfaces 30 on the inside of the leaves 12 and which expand the leaves to an anchoring position as the wedging plug moves downwardly relative to the leaves.

When ready for use, the anchor assembly including the wedging plug is in position on the lead end of a roof bolt with the top end of the tapered plug adjacent the bail of the anchor shell and a removable collar encircles the leaves to hold them in a non-expanded position.

Preferably the spring hooks and the legs are formed around the top of the flats on the wedging plug to assist in preventing rotation of the nut with the bolt. The flats adjacent the top of the nut may have vertical shoulders along the sides of the legs and the spring hooks.

FIG. 5 illustrates a roof bolt 32 with the anchoring assembly 10 thereon partly inserted into a bore hole. As will be well understood by those in the art, when inserted, the wedging plug is threaded onto the leading end of the roof bolt 32 with the top of the wedging plug against the middle part of the bail, as shown in FIG. 5, and with the end of the bolt at the top of the plug. As the threaded end of the roof bolt is pushed upwardly into the bore hole, the anchor assembly is pushed along by the plug. Conventionally, some expansion of the leaves may be present on insertion when a band or collar, similar to that shown in phantom in FIG. 1 and indicated by the reference numeral 33, is pulled. The collar holds the anchor leaves in a generally cylindrical configuration before and at the start of insertion into the hole. It is pulled by the workman as the anchor assembly is inserted and this may allow the bottom portions of the leaves to drag along the wall of the bore hole and to be against the wall when the bolt is jerked downwardly to initially set the anchor assembly.

In accordance with one aspect of the preferred embodiment, the anchor assembly is of a known type in which the legs of the bail are connected to the bottom portions of the leaves and the leaves have slots 34 extending downwardly along the legs for substantially the entire length of the legs so that the top of the leaves can move outwardly relative to the legs of the bail. With the bottom of the leaves against the wall the tops of the leaves move are wedged outwardly in a pivoting fashion relative to the bottom of the leaves and the connection of the legs thereto to take a generally cylindrical configuration against the side wall of the bore hole.

On insertion into the bore hole the spring hooks are resiliently deformed by the sidewall of the hole as shown in FIG. 5 to establish spring forces urging the hooks against the sidewall. The downward and outward angle of the hooks allows the anchor assembly to be pushed upwardly but the ends of the hooks will dig in or snag the sidewall to hold against movement in a downward direction. In the fully inserted position, the bolt head will be against the mine roof and the roof bolt is ready to be jerked downwardly to set the anchor assembly and bolt. On jerking downwardly the spring biased ends of the hooks will almost immediately prevent downward movement of the anchor shell and little drop of the bolt and/or anchor shell will occur. FIG. 6 shows the nut dropped somewhat from the bail and the hooks biting into the sidewall of the bore. In the preferred embodiment, the tapered sides of the wedge plug extend a substantial distance in-between the leaves during insertion and the tapers on the surfaces 28 on the plug and surfaces 30 on the leaves are such that the plug requires little or no drop to cause expanding engagement with the leaves.

The angle of taper on the plug for the surfaces 28 is such that in the unexpanded generally cylindrical configuration of the anchor shell, the surfaces 28 and 30 diverge so that the plug will maintain engagement with the surfaces 30 toward the top of the plug and as the plug moves downwardly it causes the top portions of the leaves to move outwardly. The diverging angle on the engaging surfaces maintains the engagement of the plug with the leaves above the lower portion of the nut and precludes the bottom portion of the plug surfaces 28 from engaging the surfaces 30 of the leaves in a plowing fashion. As the nut moves downwardly, the leaves are expanded into a generally cylindrical configuration against the side wall of the hole as shown in FIG. 8.

With the anchor assembly set, the bolt head, which has dropped from the surface of the mine roof, is driven to thread the bolt through the plug until the bolt is held against movement by the mine roof precluding further upward movement of the bolt head. Thereafter, rotation of the bolt causes the plug to thread downwardly on the bolt to expand the leaves to securely clamp the leaves against the sidewall and tension the bolt with the leaves being fully expanded to establish a generally cylindrical configuration in engagement with the sidewall as is shown in FIG. 8.

If the hooks hang up quickly with little drop of the bolt head as anticipated, the anchor may be firmly anchored in the bore hole and tensioned without moving the bolt through the bail. However, under various conditions in the mine, a drop of the bolt head may occur which requires that the bolt be threaded through the plug a distance greater than the distance between the bolt end and the bail before the anchor shell is initially set by the hooks. In such a situation, the bolt, when rotated to move its head against the roof, will engage self-threading projections 40 extending inwardly from the periphery of the central opening 20 before the bolt head reaches the roof. The projections 40 extend inwardly to define a circle of a diameter which is preferably somewhat less than the minor diameter of the bolt with the ends 44 of the projections being of a nature to operate in the manner of a self threading single thread form projections which will engage the unthreaded chamfered leading end portion 32a of the bolt. The chamfered portion 32a preferably has a conical chamfer extending from the minor diameter of the bolt to the end of the bolt. The projections 40 are such to form a high torque interference fit when self-threading into the thread form of the bolt. Self-threading forms are well known in the fastener art.

When the roof bolt has threaded through the plug to engage the bail, the bolt may initially spin against the projections 40 defining the single thread form until sufficient force is created by rotation of the bolt in the plug to start the action of the projections to create the interference fit with the bolt. The initial spinning and the resistance of the interference fit as the bolt is rotated causes a firm anchoring of the assembly as the bolt continues to thread through the plug and the bail until the bolt head is precluded from moving upwardly by the mine roof. Further torquing of the bolt head now loads both the threaded connections with the bail and with the plug and tensions the bolt. The loading of the connection with the bail establishes additional clamping forces though the legs of the bail and tensions the bolt between the nut and the bail.

As the bolt head is torqued against the mine roof to load the plug and the bail, the bail will tend to crush downwardly toward the plug. Forces created in the bail will be transmitted to the leaves by the legs of the bail and increase the bite of the leaves and the clamping force for the leaves.

Since the reaction forces at the bail will act to tension the bolt, the forces may tend to relieve some of the load on the threads of the plug and the resultant clamping forces, but it is believed that this is at least compensated by the added clamping forces from the bail and that the clamping forces of the plug can be reestablished by further torquing of the bolt and that the total tension in the bolt is increased as well as the resistance to dislodgement of the anchor.

The upward projections 40 shown in FIGS. 1-8 are also useful for piercing capsules of conventional bonding material which are used in the top of the bore holes at times to form a bond between the anchor assembly and the walls of the bore hole.

In practice, the preferred form of the bail projections is shown in FIGS. 9 and 10 in which projections 40a extend downwardly from the bail instead of upwardly as in the first described embodiment. The ends of the projections are formed as in the first described embodiment to provide the interference fit with the threads of the bolt. The other parts of the roof bolt assembly have been given the same number as the corresponding parts of the assembly of FIGS. 1-8.

The projections 40a of FIGS. 9 and 10 are preferred because of the creation of greater outward forces in the middle portion of the bail, both during the threading through of the bolt and when the bolt is held against axial movement by the mine roof and torqued. These forces will tend to bow the legs of the bail more to cause the anchor assembly to be clamped with a truer cylindrical configuration with greater working engagement of the outside of the leaves with the sidewall of the bore hole.

It will be noted that in the preferred embodiments illustrated, the leading end of the bolt is shown as having a tapered conically shaped end portion 32a extending from the minor diameter to the end of the bolt so that the end of the bolt has a diameter slightly less than the minor diameter of the bolt, e.g. about 15% less. The ends 44 and 44a of the self threading projections 40 and 40a are curved circularly to substantially correspond to the circular periphery of the bolt at its leading end and define a circular opening of substantially the diameter of the leading end of the bolt. In accordance with conventional self-threading single thread form practices, the ends of the projections may be axially displaced in sequence in accordance with the pitch of the bolt thread. However, as the bolt is forced though the smaller opening defined by the projections while being rotated, the projections will find the thread valley on the bolt to provide a high torque interference fit even if not if displaced from a common plane in accordance with the parameters for defining the thread pitch of the bolt. This is because of the give in the bail and the projections to allow the projections to find, conform to, or be forced into the thread valley of the bolt as the bolt is rotated and threads through the plug and the bail.

While the bolt in the drawings is shown with a right hand thread, normally a left hand thread is used in mine roof bolts. The present invention is applicable to either.

In practice, it is preferable that the surfaces 30 on the leaves 12 extend substantially the full length of the leaf as illustrated in FIG. 6.

While the description of the present invention has been made in connection with a mine roof bolt to which it is particularly applicable, it will be understood that it may be used in other applications where a bolt is to be securely anchored by clamping anchor leaves against the sidewall of bore. While the description and the claims use the terms downwardly and upwardly it is to be understood that the terms are used in the sense that the bail of the anchor assembly is at the top or up and the entry opening for the bore is at the bottom or down, regardless of the actual orientation or the assembly or bore hole.

What I claim is:

1. An anchor assembly for anchoring a mine roof bolt, or the like, in a bore hole, the assembly comprising an anchor shell having anchor leaves arranged about a shell axis for engaging the side wall of a bore hole for anchoring the assembly, and a bolt having its threaded lead end disposed coaxially therein and a bail interconnecting the leaves, said bail comprising a middle portion extending crosswise of the axis above the leaves of the anchor shell and having spring fingers extending downwardly and outwardly from the bail above the leaves with each terminating in an end portion to be resiliently deformed by the sidewall of a borehole into which the anchor shell is inserted to bias the terminating end portions of the fingers against the sidewall of the hole, the terminating end portion of each finger being angularly disposed with respect to the axis and having an edge portion extending outwardly of the axis to be biased against the side wall of a borehole when the anchor shell is inserted therein for holding the anchor assembly against retraction by snagging the sidewall of the hole.

2. An anchor assembly for a bolt as defined in claim 1 in which said fingers extend downwardly from opposed portions of the periphery of said middle portion of said bail.

3. An anchor assembly for a bolt as defined in claim 2 wherein the middle portion of said bail comprises a circular portion and said fingers extend downwardly from diametrically opposed portions of the circumference of said circular portion and terminate above the tops of said leaves and have end portions angularly disposed with respect to the axis of the shell.

4. An anchor assembly for a bolt as defined in claim 2 wherein said shell has two opposed anchoring leaves and said bail has opposed legs extending downwardly from opposed perimeter portions of said middle portion connected to said leaves at their lower end portions, said leaves having openings along and for substantially the length of the legs to allow the leaves to move outwardly of said leaves about the lower ends thereof.

5. An anchor assembly for a bolt as defined in claim 1 wherein said anchor assembly comprises an internally threaded tapered wedging plug having tapered surfaces for engaging said leaves to expand the latter into engagement with the side wall of a bore hole, said tapered plug being threadable onto the leading end of a bolt and positionable on the leading end thereof in engagement with the under side of the middle portion of said bail to carry said shell into said bore hole at the lead end of the bolt onto which said plug is threaded.

6. An anchor assembly for a bolt as defined in claim 4 wherein said anchor assembly comprises an internally threaded tapered wedging plug having tapered surfaces for engaging said leaves to expand the latter into engagement with the side wall of a bore hole, said tapered plug being threadable on to the leading end of the bolt and positionable in a position in engagement with the under side of the middle portion of said bail to carry said shell into said bore hole at the lead end of the bolt onto which said plug is threaded.

7. An anchor assembly for a bolt as defined in claim 5 in which said fingers extend downwardly from opposed portions of the periphery of said middle portion of said bail.

8. An anchor assembly for a bolt as defined in claim 7 wherein the middle portion of said bail comprises a circular portion and said fingers extend downwardly from diametrically opposed portions of the circumference of said circular portion.

9. An anchor assembly for a bolt as defined in claim 5 wherein said leaves have cooperating surfaces engaged by tapered surfaces of said plug to move the leaves outwardly to engage the side wall of the bore hole with the leaves defining a substantially cylindrical configuration when in engagement with the sidewall, said tapered surfaces and cooperating and leaves solely above the lower portion of said tapered surfaces of the plug.

10. An anchor assembly for a bolt as defined in claim 6 wherein said leaves have cooperating surfaces engaged by said tapered surfaces of said plug to move the leaves outwardly to engage the side wall of the bore hole with the leaves defining a substantially cylindrical configuration when in engagement with the sidewall, said tapered surfaces and cooperating surfaces diverging downwardly to effect and maintain engagement of the plug and leaves solely above the lower portion of said tapered surface surfaces of the plug.

11. An anchor assembly for bolt as defined in claim 1 in which the middle portion of said bail has means in the path of said bolt for providing a resistance to axial movement of the bolt when said bolt is rotated into engagement therewith to provide initial travel of a tapered plug to expand said leaves and responsive to rotational and axial forces produced by rotating and torquing said bolt against the bail to provide a threaded connection between said bail and the bolt comprising an opening on the axis of the shell of a diameter for passing the roof bolt therethrough and projections extending inwardly of the opening to define a form of smaller diameter than the outside diameter of the bolt for threadingly cooperating with the threads of a roof bolt being threaded through a tapered plug for expanding said leaves to provide an interference thread fit between the bolt and the projections to establish a torque load for the bolt to produce forces in the bail and tension in the bolt in response to the bolt threading into said opening and torque to establish tension in the bolt.

12. An anchor assembly for bolt as defined in claim 4 in which the middle portion of said bail has means in the path of said bolt for providing a resistance to axial movement of the bolt when said bolt is rotated into engagement therewith to provide initial travel of a tapered plug to expand said leaves and responsive to rotational and axial forces produced by torquing said bolt against the bail when said bolt is rotated into engagement therewith to provide a threaded connection between said bail and the bolt comprising an opening on the axis of the shell for passing the roof bolt and projections extending inwardly of the opening to define a form of smaller diameter than the outside diameter of the bolt for threadingly cooperating with the threads of a roof bolt being threaded through the tapered plug for expanding said anchor shell to provide an interference thread fit between the bolt and the projections to establish a torque load for the bolt to produce forces in the bail and tension in the bolt in response to the bolt threading into said opening and being torqued to establish tension in the bolt.

13. An anchor assembly for bolt as defined in claim 5 in which the middle portion of said bail has means in the path of said bolt for providing a resistance to axial movement of the bolt when said bolt is rotated into engagement therewith to provide initial travel of a tapered plug to expand said leaves and responsive to rotational and axial forces produced by torquing said bolt against the bail when said bolt is rotated into engagement therewith to provide a threaded connection between said bail and the bolt with the bail comprising an opening on the axis of the shell of a diameter for passing the roof bolt and projections extending inwardly of the opening to define a form of smaller diameter than the outside diameter of the bolt for threadingly cooperating with the threads of a roof bolt being threaded through the tapered plug to provide an interference thread fit between the bolt and the projections to establish a torque load for the bolt to produce forces in the bail and tension in the bolt in response to the bolt threading into said opening and torqued to establish tension in the bolt.

14. An anchor assembly for bolt as defined in claim 9 in which the middle portion of said bail has means in the path of said bolt for providing a resistance to axial movement of the bolt when said bolt is rotated into engagement therewith to provided initial travel of a tapered plug to expand said leaves and responsive to rotational and axial forces produced by torquing said bolt against the bail when said bolt is rotated into engagement therewith to provide a threaded connection between said bail and the bolt comprising an opening on the axis of the shell for passing the roof bolt and projections extending inwardly of the opening to define a form of smaller diameter than the outside diameter of the bolt for threadingly cooperating with the threads of a bolt being threaded through said tapered plug to provide an interference thread fit between the bolt and the projections to establish a torque load for the bolt to produce forces in the bail and tension in the bolt in response to the bolt threading into said opening and being torqued to establish tension in the bolt.

15. A anchor assembly for bolt as defined in claim 6 in which the middle portion of said bail has means in the path of said bolt for providing a resistance to axial movement of the bolt when said bolt is rotated into engagement therewith to provide initial travel of said tapered plug to expand said leaves and responsive to rotational and axial forces produced by torquing said bolt against the bail when said bolt is rotated into engagement therewith to provide a threaded connection between said bail and the bolt comprising an opening on the axis of the shell of a diameter for passing the roof bolt and projections extending inwardly of the opening to define a form of smaller diameter than the outside diameter of the bolt for threadingly cooperating with the threads of a roof bolt being threaded through said tapered plug to provide an interference thread fit between the bolt and the projections to establish a torque load for the bolt to produce forces in the bail and tension in the bolt in response to the bolt threading into said opening and being torqued to establish tension in the bolt.

16. An anchor assembly for a mine roof bolt comprising a shell having anchor leaves disposed about a shell axis for engaging the side wall of a bore hole for anchoring the assembly and a roof bolt disposed therein in a bore hole, and a bail interconnecting the leaves, the bail comprising a middle portion extending crosswise of the shell axis above the leaves, said bail having a central opening on the axis of the shell of a diameter for passing a roof bolt being rotated therethrough, said bail having projections extending inwardly of the central opening with the ends of the projections being curved and adapted to fit between the thread flanks of a roof bolt for providing a threaded connection with the roof bolt being rotated through the opening, said projections providing an interference thread fit between the bolt and the projections for establishing and maintaining a torque load for the bolt as it threads through the central opening.

17. An anchor shell assembly for a mine roof bolt as defined in claim 16 wherein said bolt tapers at its leading end to a smaller outside diameter and said projections have arcuate ends which are positioned to define a diameter approximating said smaller outside diameter.

18. An anchor shell assembly for a mine roof bolt as defined in claim 16 wherein said projections are displaced from the plane of said bail and have arcuate ends which approximate a single thread form of the pitch of said bolt and wherein the projections define an opening of smaller diameter than said central opening.

19. An anchor assembly for a mine roof bolt as defined in claim 16 wherein said projections extend upwardly from said bail to form segments of a dome.

20. An anchor assembly for a mine roof bolt as defined in claim 16 wherein said projections extend downwardly from said bail.

21. An anchor shell assembly for a mine roof bolt as defined in claim 19 wherein said bolt tapers at its leading end to a smaller outside diameter and said projections have accurate ends which are positioned to define a diameter approximating said smaller outside diameter.

22. An anchor shell assembly for a mine roof bolt as defined in claim 20 wherein said bolt tapers at its leading end to a smaller outside diameter and said projections have accurate ends which are positioned to define a diameter approximating said smaller outside diameter.

23. An anchor shell assembly for a mine roof bolt as defined in claim 19 wherein said projections are displaced from the plane of said bail and have arcuate ends which approximate a thread form of the pitch of said bolt and wherein the projections define an opening of smaller diameter than said central opening.

24. An anchor shell assembly for a mine roof bolt as defined in claim 20 wherein said projections are displaced from the plane of said bail and have arcuate ends which approximate a thread form of the pitch of said bolt and wherein the projections define an opening of smaller diameter than said central opening.

25. In an anchor assembly for a mine roof bolt as defined in claim 16, a tapered internally threaded wedge plug positioned between said leaves and threadable on the roof bolt for expanding said leaves, the roof bolt being threadable through said plug into engagement with said projections to cause said nut to move downwardly on said bolt to expand said leaves and set the anchor leaves in the bore hole.

26. An anchor assembly for a mine roof bolt as defined in claim 25 wherein said leaves are free to expand to a cylindrical configuration against the sidewall of a borehole and said bail has individual legs connected to the bottom portions of respective ones said leaves to move therewith on expansion of said leaves, said sleeves having slots therein along said legs to allow said leaves to move outwardly of the legs and to engage the sidewall of a borehole in a susbstantially cylindrical configuration, said plug having tapered surfaces for engaging said leaves and said leaves having cooperating surfaces engaged by said tapered surfaces of said plug to move said leaves including said bottom portions outwardly to engage the side wall of the bore hole with the leaves, said tapered surfaces and cooperating surfaces diverging downwardly to effect and maintain engagement of the plug and leaves solely above the lower portion of the plug for substantially the full length of the leaves.

27. An anchor assembly for a mine roof bolt comprising a shell having substantially cylindrically curved anchor leaves arranged about an axis and expandable to a substantially cylindrical configuration to engage substantially the full length of the leaves with the side wall of a bore hole to anchor the assembly and a roof bolt therein, and a bail interconnecting the leaves, said bail comprising a middle portion extending crosswise of the shell axis above the leaves and having opposed legs extending downwardly from opposed perimeter portions of said middle portion which are connected to said leaves at their lower ends, said leaves having openings therein alongside said legs for substantially the length of the legs to allow the leaves to move outwardly of said legs about the lower ends thereof to a substantially cylindrical configuration against the sidewall of the bore hole, an internally threaded wedging plug having tapered surfaces for engaging said leaves to expand the latter into engagement with the side wall of a bore hole, said tapered plug being theadable on to the leading end of a roof bolt in a position in engagement with the underside of the middle portion of said bail to carry said shell into said bore hole at the lead end of the mine roof bolt onto which said plug is threaded, said leaves having cooperating surfaces engaged by said tapered surfaces of said plug to move the leaves outwardly to engage the side wall of the bore hole with the leaves defining a substantially cylindrical configuring when in anchoring engagement with the sidewall, said tapered surfaces and cooperating surfaces diverging downwardly for the full length of travel of said plug to effect and maintain engagement of the plug and leaves solely above the leading portion of said tapered surfaces on the lower portion of the plug.

28. An anchor assembly as defined in claim 27 in which said cooperating leaf surfaces extend from substantially the top of the leaves to the connection of said legs at the bottom portions of said leaves.

29. An anchor assembly for anchoring a mine roof bolt, or the like, in a bore hole, the assembly comprising an anchor shell having two opposed anchor leaves arranged about a shell axis for engaging the side wall of a bore hole for anchoring the assembly and a bolt having its threaded lead end disposed coaxially therein, and a bail interconnecting the leaves, said bail comprising a middle portion extending crosswise of the axis above the leaves of the anchor shell and having opposed spring fingers extending downwardly and outwardly from the periphery of said middle portion of said bail to be resiliently deformed by the sidewall of a borehole into which the anchor shell is inserted to bias the fingers against the sidewall of the hole so as to resist downward movement of the anchor shell and retraction from the hole, said fingers terminating in end portions which are disposed above said leaves and which are angularly disposed with respect to the axis of the shell, and said shell having two legs extending downwardly from opposed perimeter portions of said middle portion and connected to said leaves at the lower end portions thereof, said leaves having openings alongside and for substantially the length of the legs to allow the leaves to move outwardly of said legs about the lower ends thereof.

30. An anchor assembly for a bolt as defined in claim 29 wherein the middle portion of said bail comprises a circular portion and said fingers extend downwardly from diametrically opposed portions of the circumference of said circular portion.

31. An anchor assembly for a bolt as define din claim 29 wherein said anchor assembly comprises an internally threaded tapered wedging plug having tapered surfaces for engaging said leaves to expand the latter into engagement with the side wall of a bore hole, said tapered plug being threadable on to the leading end of the bolt and positionable in a position in engagement with the under side of the middle of said bail to carry said shell into said bore hole at the lead end of the bolt onto which said plug is threaded.

* * * * *